United States Patent [19]
Greenwalt

[11] Patent Number: 5,470,375
[45] Date of Patent: * Nov. 28, 1995

[54] METHOD OF PROCESSING WASTE MATERIAL CONTAINING NON FERROUS METAL OXIDES

[75] Inventor: Richard B. Greenwalt, Danville, Calif.

[73] Assignee: Bechtel Group, Inc., San Francisco, Calif.

[*] Notice: The portion of the term of this patent subsequent to Aug. 16, 2011, has been disclaimed.

[21] Appl. No.: 194,898

[22] Filed: Feb. 14, 1994

Related U.S. Application Data

[63] Continuation of Ser. No. 84,853, Jun. 30, 1993, Pat. No. 5,338,336.

[51] Int. Cl.[6] .................................................. C21B 13/14
[52] U.S. Cl. ................................................ 75/505; 75/961
[58] Field of Search ......................... 75/585, 505, 961

[56] References Cited

U.S. PATENT DOCUMENTS

| | | | |
|---|---|---|---|
| 3,850,615 | 11/1974 | Reeves | 75/26 |
| 4,070,181 | 1/1978 | Widell | 75/91 |
| 4,073,642 | 2/1978 | Collin et al. | 75/35 |
| 4,389,043 | 6/1983 | Weber et al. | 266/218 |
| 4,448,402 | 5/1984 | Weber et al. | 266/183 |
| 4,588,437 | 5/1986 | Kepplinger et al. | 75/43 |
| 4,605,205 | 8/1986 | Langner et al. | 266/160 |
| 4,725,308 | 2/1988 | Kepplinger | 75/26 |
| 4,806,158 | 2/1989 | Hirsch et al. | 75/26 |
| 4,822,411 | 4/1989 | Standler et al. | 75/35 |
| 4,849,015 | 7/1989 | Fassbinder et al. | 75/26 |
| 4,874,427 | 10/1989 | Hamada et al. | 75/26 |
| 4,889,323 | 12/1989 | Pusch et al. | 266/142 |
| 4,895,593 | 1/1990 | Sulzbacher et al. | 75/26 |
| 4,897,179 | 1/1990 | Mori et al. | 208/127 |
| 4,913,733 | 4/1990 | Hauk | 75/491 |
| 4,946,498 | 8/1990 | Weber | 75/26 |
| 4,957,545 | 9/1990 | Hikosaka et al. | 75/501 |
| 5,139,567 | 8/1992 | Matsuoka et al. | 75/500 |
| 5,186,741 | 2/1993 | Kotraba et al. | 75/961 |
| 5,279,643 | 1/1994 | Kaneko et al. | 75/961 |

FOREIGN PATENT DOCUMENTS

0468950A2  1/1991  European Pat. Off. .

OTHER PUBLICATIONS

Fleichtner, Hanns et al. "The Corex Process" *Skillings' Mining Review*, Jan. 14, 1989, pp. 20–27.

*Primary Examiner*—Melvyn Andrews
*Attorney, Agent, or Firm*—Townsend and Townsend and Crew

[57] ABSTRACT

The present invention provides a method for processing environmentally undesirable materials including petroleum coke and the sulfur and heavy metals contained therein and agglomerated waste dust from an electric arc furnace and the zinc, cadmium, lead and iron oxides contained therein and of providing fuel and a charging material for a process of making molten iron or steel preproducts and reduction gas in a melter gasifier. Metallized arc furnace waste dust material from a reduction furnace is introduced into the melter gasifier. The petroleum coke, oxygen and metallized waste dust material are reacted to produce reduction gas and molten iron from the iron oxides in the waste dust material. The molten iron contains the metals freed from combustion of the petroleum coke. The reduction gas is removed from the melter gasifier for use in the reduction furnace to produce an top off gas containing vapors of zinc, cadmium and lead.

4 Claims, 3 Drawing Sheets

METHOD OF PROCESSING WASTE MATERIAL CONTAINING NON FERROUS METAL OXIDES

This application is a continuation of U.S. patent application Ser. No. 08/084,853, filed Jun. 30, 1993. Now U.S. Pat. No. 5,338,336 issued Aug. 16, 1994.

BACKGROUND OF THE INVENTION

The invention relates to a method for processing environmentally undesirable materials including petroleum coke and the sulfur and heavy metals contained therein and waste dust from an electric arc furnace and the cadmium, lead, zinc and iron oxide contained therein to provide fuel and a charging material for a process of making molten iron or steel preproducts and reduction gas in a melter gasifier.

Electric arc furnaces utilize scrap to make steel products. Scrap iron or steel typically has zinc, cadmium and lead contained therein. These materials cause a disposal problem when the scrap steel is processed in an electric arc furnace. The zinc, cadmium and lead are collected in a waste material known as electric arc furnace dust. Electric arc furnace dust is classified as a hazardous waste material and heretofore has been disposed of in hazardous waste dumps. It has been estimated that there are approximately 2 million tons per year of electric arc furnace dust accumulated in the United States. Disposal of electric arc furnace dust in a hazardous waste dump may cost upwards of $150 to $200 per ton.

Petroleum coke is a product of refinery operations and is produced in the United States utilizing three types of coke processing technology. Specifically these technologies as known to one skilled in the art are delayed, fluid and flexi. By far most petroleum coke in the United States is produced using delayed technology. In 1990, according to the U.S. Department of Energy, 55 refineries in the United States which had coking facilities and a refinery capacity of 8 million barrels per day produced slightly over 76,000 short tons per day of petroleum coke. The residual petroleum coke produced amounted to about 6% by weight of each barrel of crude oil processed by the refineries.

Petroleum coke is generally the bottom end of refinery operations after most of the light ends and oils have been recovered from the original crude. The make up of petroleum coke will vary depending on a number of factors including the crude being processed and the process being utilized. Generally on a dry basis petroleum coke will be composed largely (approximately 90%) of fixed carbon and typically include sulfur (0.05% to 6%) and nitrogen (2% to 4%). Various metals typically including vanadium, iron and nickel are found in petroleum coke. Usually, a typical petroleum coke contains about 10% volatile matter. Petroleum coke contains up to 10 to 15% moisture before drying.

Petroleum coke is produced either as blocky sponge coke or needle coke from delayed cokers or in a shot size form from fluid bed cokers. Sponge coke from delayed cokers is by far the most important coke produced in the United States. Calcined sponge coke is used primarily in the manufacture of graphite electrodes, anodes and shaped products. Approximately one-fourth of the sponge coke production is used in these products.

Until recent years the remainder of the petroleum coke in the U.S. was used as fuel for power plants and cement kilns. However due to the high sulfur content, the need for blending with coal to maintain ignition and flame stability and environmental problems, petroleum coke has become less suitable as a boiler fuel. The high sulfur content of petroleum coke also poses problems for cement kilns. Excess sulfur will cause finished concrete to expand and crack and also influences setting time. The high vanadium content also poses refractory problems. Thus there is a substantial amount of excess petroleum coke which must be disposed. The high sulfur content and the relatively high amounts of metals such as vanadium and nickel make such disposal a real environmental problem which the present invention is directed to solving.

U.S. Pat. No. 4,849,015 to Fassbinder et al. discloses a method for two-stage melt reduction of iron ore, in which iron ore is prereduced substantially to wustite and at the same time melted down in a melting cyclone, and then liquid hot metal is produced in an iron bath reactor connected to the outlet of the melting cyclone and receiving the melted wustite by adding carbonaceous fuels and oxidizing gas to the melt. The resulting reaction gas from the melt is afterburned, and the dust-laden, partly burned reaction gases from the iron bath reactor are accelerated and further afterburned by adding a hot blast with a temperature of 800° C. to 1500° C., and at least a portion of such accelerated, after burned reaction gases are introduced into the melting cyclone to reduce and melt fresh iron ore.

Carbonaceous fuels, such as coke, carbonized lignite, petroleum coke, etc., but preferably coal of varying quality, are fed to the melt in the iron bath reactor. Slag-forming additives, such as lime, fluorspar, etc., are also fed to the iron melt to set the desired slag composition. Although it is irrelevant for the present invention whether these substances are introduced into the melt on the bath surface or from below the bath surface, it is preferable to add them through underbath feed nozzles.

U.S. Pat. No. 4,806,158 to Hirsch et al. discloses a process for the production of reduced iron oxide-containing materials. Iron oxide and solid carbonaceous reducing agent are charged into a first expanded fluidized bed, which is supplied with an oxygen-containing fluidizing gas. The gas residence time selected is controlled in the reactor containing the first fluidized bed so that the reduction potential will result in a reduction of the iron oxide material not in excess of the FeO stage. A gas-solids suspension discharged from the first fluidized bed is supplied to a second expanded fluidized bed, which is supplied with a strongly reducing fluidizing gas. Strongly reducing gas and a major portion of the resulting devolatilized carbonaceous material are discharged from the upper portion of the second fluidized bed. Reduced material having a metallization of 50 to 80% and the remaining devolatilized carbonaceous material are discharged from the lower portion of the second fluidized bed. Suitable carbonaceous materials include all coals, from anthracite to lignite, carbonaceous minerals and waste products, such as oil shale, petroleum coke or washery refuse, provided that they are solid at room temperature. The oxygen-containing gas preferably consists of oxygen or of oxygen-enriched air.

U.S. Pat. No. 4,897,179 to Mori et al. provides a method of producing reduced iron and light oil from iron ore and heavy oil which comprises a thermal cracking step of subjecting heavy oil to thermal cracking while retaining iron ore particles in a fluidized state to produce light oil and simultaneously to deposit coke as by-product on the surface of the iron ore particles; a gasification step of putting the coke-deposited ore in contact with an oxidizing gas including steam and oxygen in a fluidized state to react the coke with the gas thereby to produce a reducing gas containing hydrogen and carbon monoxide and of heating the coke-deposited ore upward of a reduction temperature of iron ore by partial oxidization of the coke; and a reduction step of reducing the coke-deposited iron ore in a fluidized state by the reducing gas to produce reduced iron. When the gasification step is performed by an oxidizing gas containing a majority of steam and up to 15 vol. %, based on the steam, of oxygen at 800°–1000° C. under a pressure of 0–10 kg/cm$^2$G, a reducing gas containing high-concentration hydrogen gas is obtained.

Slags of high sulfur capacity have been utilized in applications associated with ferrous metallurgy. Kleimeyer et al. in U.S. Pat. No. 4,600,434 describe the use of high sulfur capacity slag and magnesium metal to desulfurize molten iron while it is contained in a torpedo car. Quigley, U.S. Pat. No. 4,853,034, describes using a vanadium-bearing, high-magnesia synthetic calcium aluminate slag for absorbing sulfur during ladle refining of steel. Knauss et al., U.S. Pat. No. 4,695,318, describe using a synthetic slag similar to that of U.S. Pat. No. 4,853,034, and the refractory brick of the ladle itself, to desulfurize molten iron contained in said ladle.

In recent years methods utilizing a melter gasifier have been developed to produce molten iron or steel preproducts and reduction gas. Most of these processes utilize a coal fluidized-bed. A high temperature is produced in the melter gasifier utilizing coal and blown in oxygen to produce a fluidized bed and iron sponge particles are added from above to react in the bed to produce the molten iron.

Thus in European Patent B1-0010627, a coal fluidized-bed with a high-temperature zone in the lower region is produced in a melter gasifier, to which iron sponge particles are added from above. On account of the impact pressure and buoyancy forces in the coal fluidized-bed, iron sponge particles having sizes greater than 3 mm are considerably braked and substantially elevated in temperature by the heat exchange with the fluidized bed. They impinge on the slag layer forming immediately below the high-temperature zone at a reduced speed and are melted on or in the same. The maximum melting performance of the melter gasifier, and thus the amount and temperature of the molten iron produced, not only depends on the geometric dimensions of the melter gasifier, but also are determined to a large extent by the quality of the coal used and by the portion of larger particles in the iron sponge added. When using low-grade coal, the heat supply to the slag bath, and thus the melting performance for the iron sponge particles, decline accordingly. In particular, with a large portion of iron sponge particles having grain sizes of about 3 mm, which cannot be heated to the same extent as smaller particles by the coal fluidized-bed when braked in their fall and which, therefore, necessitate a higher melting performance in the region of the slag layer, the reduced melting performance has adverse effects in case low-grade coal is used.

A melter gasifier is an advantageous method for producing molten iron or steel preproducts and reduction gas as described in U.S. Pat. No. 4,588,437. Thus there is disclosed a method and a melter gasifier for producing molten iron or steel preproducts and reduction gas. A first fluidized-bed zone is formed by coke particles, with a heavy motion of the particles, above a first blow-in plane by the addition of coal and by blowing in oxygen-containing gas. Iron sponge particles and/or pre-reduced iron ore particles with a substantial portion of particle sizes of more than 3 mm are added to the first fluidized-bed zone from above. A melter gasifier for carrying out the method is formed by a refractorily lined vessel having openings for the addition of coal and ferrous material, openings for the emergence of the reduction gases produced, and openings for tapping the metal melt and the slag. Pipes or nozzles for injection of gases including oxygen enter into the melter gasifier above the slag level at at least two different heights.

Another process utilizing a melter gasifier is described in U.S. Pat. No. 4,725,308. Thus there is disclosed a process for the production of molten iron or of steel preproducts from particulate ferrous material as well as for the production of reduction gas in the melter gasifier. A fluidized-bed zone is formed by coke particles upon the addition of coal and by blowing in oxygen-containing gas by nozzle pipes penetrating the wall of the melter gasifier. The ferrous material to be reduced is introduced into the fluidized bed. In order to be able to produce molten iron and liquid steel preproducts in a direct reduction process with a lower sulfur content of the coal used, the ferrous material to be reduced is supplied closely above the blow-in gas nozzle plane producing the fluidized bed. An arrangement for carrying out the process includes a melter gasifier in which charging pipes penetrating its wall are provided in the region of the fluidized-bed zone closely above the plane formed by the nozzle pipes. The ferrous material to be melted as well as the dusts separated from the reduction gas and, if desired, fluxes containing calcium oxide, magnesium oxide, calcium carbonate and/or magnesium carbonate are introduced therethrough.

There is also a process known as the COREX® process (COREX® is a trademark of Deutsche Voest-Alpine Industrieanlagenbau GMBH and Voest-Alpine Industrieanlagenbau). This process is described in *Skilling's Mining Review*, Jan. 14, 1989 on pages 20–27. In the COREX® process the metallurgical work is carried out in two process reactors: the reduction furnace and the melter gasifier. Using non-coking coals and iron bearing materials such as lump ore, pellets or sinter, hot metal is produced with blast furnace quality. Passing through a pressure lock system, coal enters the dome of the melter gasifier where destructive distillation of the coal takes place at temperatures in the range of 1,100°–1,150° C. Oxygen blown into the melter gasifier produces a coke bed from the introduced coal and results in a reduction gas consisting of 95% CO+H$_2$ and approximately 2% CO$_2$. This gas exits the melter gasifier and is dedusted and cooled to the desired reduction temperature between 800° and 850° C. The gas is then used to reduce lump ores, pellets or sinter in the reduction furnace to sponge iron having an average degree of metalization above 90%. The sponge iron is extracted from the reduction furnace using a specially designed screw conveyor and drops into the melter gasifier where it melts to the hot metal. As in the blast furnace, limestone adjusts the basicity of the slag to ensure sulfur removal from the hot metal. Depending on the iron ores used, SiO$_2$ may also be charged into the system to adjust the chemical composition and viscosity of the slag. Tapping procedure and temperature as well as the hot metal composition are otherwise exactly the same as in a blast furnace. The top gas of the reduction furnace has a net calorific value of about 7,000 KJ/Nm$^3$ and can be used for a wide variety of purposes.

The fuels used in these processes are typically described as a wide variety of coals and are not limited to a small range of coking coal. The above-noted article from *Skilling's Mining Review* notes that petroleum coke suits the requirements of the COREX® process. Brown coal and steam coal which are relatively poor quality coal having a relatively high ash content i.e. plus 15%, have been identified as suitable for use in these processes. Coke made from coal has also been identified as a fuel for many of the processes utilizing melter gasifiers.

RELATED APPLICATIONS

This application is a related to applications Ser. No. 07/958,043 filed Oct. 6, 1992; Ser. No. 07/991,914, filed Dec. 17, 1992, and Ser. No. 08/056,341, filed Apr. 30, 1993.

SUMMARY OF THE INVENTION

The present invention is directed to a solution for the disposal of two environmentally objectionable materials and provision of a new and unexpectedly superior fuel source and of a ferrous material source for processes utilizing melter gasifiers to make molten iron or steel preproducts.

In accordance with the invention it has been found that petroleum coke makes an excellent source of carbon in processes making molten iron or steel preproducts in which a melter gasifier unit is used. Further, electric arc furnace dust provides a source of iron oxide which can be converted to molten iron as well as non-ferrous heavy metal oxides of zinc, cadmium and lead which can be concentrated and recovered in the process. Moreover, the reaction in these processes utilizing the petroleum coke as a fuel in the melter gasifier tends to combust the petroleum coke substantially completely with hot reduction gas as the only gaseous product. The hot reduction gas from the molten gasifier at 850° C. is recycled to the primary reduction furnace where the iron oxide in the electric arc furnace dust is metallized and the oxides of zinc, cadmium and lead are reduced to metal and vaporized. The top off gas from the reduction furnace contains the metallized vapors of the zinc, cadmium and lead from the electric arc furnace dust. When the top off gas is scrubbed with water, the zinc, cadmium and lead are recovered in the gas washer sludge at concentrations up to 50% for metal recycle and refining. Residual sulfur from the petroleum coke is discharged as a sulfide in the slag formed in the melter gasifier and is removed and disposed of with the slag. Heavy metals from the petroleum coke are carried over in stable form in solution in the molten iron or steel preproducts and will solidify therewith.

In a broad aspect, the invention provides a method for processing environmentally undesirable materials including petroleum coke and the sulfur and heavy metals contained therein and waste dust from an electric arc furnace and the zinc, cadmium, lead and iron oxides contained therein and of providing fuel and a charging material for a process of making molten iron or steel preproducts and reduction gas in a melter gasifier. A melter gasifier is provided and has an upper fuel charging end, a reduction gas discharging end, a lower molten metal and slag collection end. Entry means are provided for charging material into the melter gasifier. Petroleum coke is introduced into the melter gasifier at the upper fuel charging end. Oxygen-containing gas is blown into the petroleum coke to form at least a first fluidized bed of coke particles from the petroleum coke. Arc furnace waste dust material is agglomerated and charged into the reduction furnace through the entry means. Petroleum coke and oxygen are reacted in the melter gasifier to partially combust the major portion of the petroleum coke to produce reduction gas which is directed to the reduction furnace. In the reduction furnace, the reduction gas reduces the metals forming metal vapors of zinc, cadmium and lead in the reduction top off gas and metallized iron from iron oxide in the waste dust material. The metallized iron is discharged hot to the melter gasifier for melting with petroleum coke and oxygen. The molten iron contains heavy metals freed from combustion of the petroleum coke. A slag is produced containing sulfur freed from combustion of the petroleum coke. The reduction top gas including the metal vapors contained therein are removed from the reduction furnace. Preferably the zinc, cadmium and lead metals from the metal vapors contained in the reduction gas are recovered and reused.

OBJECTS OF THE INVENTION

It is a particular object of the present invention to provide a process for both disposing of two environmentally undesirable materials and providing a novel fuel and ferrous material feedstock for an iron making process which utilizes a melter gasifier. Other objects and advantages of the present invention will be apparent from the following detailed description read in view of the accompanying drawings which are made a part of this specification.

DESCRIPTION OF THE PREFERRED EMBODIMENT

The invention is predicated on the recognition that petroleum coke can advantageously replace coal or coke made from coal which heretofore was used as a source of carbon in iron making processes wherein a melter gasifier is used and that electric arc furnace dust can be effectively disposed of in such a process while providing a source of ferrous material for use in iron making. Further, in accordance with the invention zinc, cadmium or lead may be recovered as a byproduct. In addition, the use of petroleum coke in the iron making process in a melter gasifier substantially completely combusts the petroleum coke thus solving an environmentally sensitive disposal problem. Sulfur and heavy metals which are contained in petroleum coke are also safely disposed of in accordance with the invention. Further, electric arc dust which is classified as a hazardous waste because of the zinc, cadmium and lead components can be safely and economically disposed of in the process while providing a source of ferrous material for iron production. The sludge resulting from the process provides a concentrated source of zinc, cadmium and lead oxides from which the metals can be removed. The reduction furnace is operated at a top gas temperature of at least 400° C., such that the metal vapors do not condense until entering the top gas scrubber. Along with entrained carbon and metallic iron dust the metal bearing sludge from the scrubber is dewatered and marketed to a recycling refiner.

Figure 1:
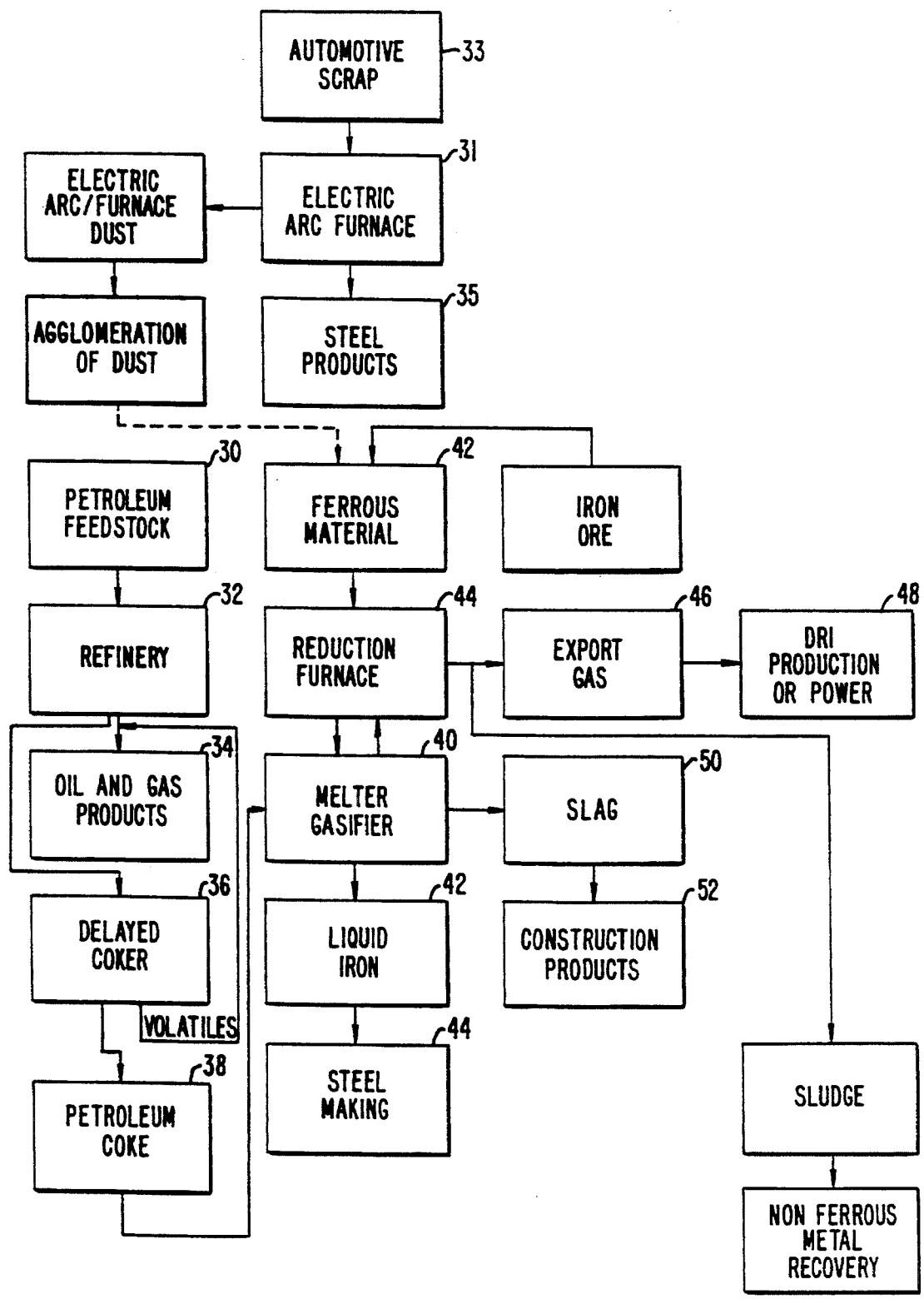
FIG. 1 is a flow diagram illustrating the present invention.

FIG. 1 is a flow diagram illustrating the method of refining crude oil and producing steel in an environmentally desirable manner wherein undesirable materials resulting in such production, namely petroleum coke and electric arc furnace dust, are disposed of in an iron making process. Petroleum feedstock 30 is introduced into a refinery 32 where oil and gas products 34 are produced. The residual coke from the refinery 32 is passed to a delayed coker unit 36 where petroleum coke 38 is produced. Volatiles from the process are returned to the oil and gas products via conduit 39. The petroleum coke amounts to about 6% by weight of the petroleum feedstock being processed.

Heretofore, disposal of the petroleum coke has been a significant problem. However, in accordance with the invention, disposal of the petroleum coke is accomplished in an advantageous manner as a fuel in an iron-making process where a melter gasifier is utilized. Thus, petroleum coke is introduced as a fuel into melter gasifier 40 for combustion with oxygen and metallic iron from source 42 which has been reduced from electric furnace dust in reduction furnace 44. Liquid iron containing heavy metals freed from the combustion of the petroleum coke is recovered in collection vessel 42 for later steel making 44. An reduction gas rich in CO is produced from the melter-gasifier and may be direct to the reduction furnace 44 and used in direct reduction of iron or as export gas 46 and used as a fuel for power production 48. Slag is withdrawn from the melter gasifier at slag collection vessel 50. The slag contains the sulfur freed from the combustion of the petroleum coke. Slag is disposed of; for example, by forming construction products 52.

An electric arc furnace 31 is useful to produce steel products 35 from automotive scrap 33 which is the principal ferrous material used to charge electric arc furnaces. Automotive scrap contains a significant amount of zinc, cadmium and lead and this material is collected in the electric arc furnace dust as a waste material from the electric arc furnace steelmaking process.

Thus, due to the use of "automotive scrap" feed, electric arc furnaces produce a waste product having high concentration of non-ferrous metals. Arc furnace "dust" includes zinc, cadmium and lead metals. The material has been designated a hazardous waste and is therefore increasingly a disposal problem for operators. Present disposal costs range between about $150 and $200 per ton of "dust." Electric arc furnace dust typically contains 5% of zinc and can contain up to 20% of zinc depending on scrap quality. Residuals of cadmium and lead, up to 1%, are contained with the zinc contamination.

The electric arc furnace dust from the furnace baghouse contains a significant amount of up to (95%) of a combination of iron oxide, lime and silica, in addition to the hazardous non-ferrous metals of concern. Iron oxide content is commonly about 50% by weight. The waste material may be agglomerated with lime and/or Portland cement, allowed to age to gain strenght and charged to a COREX® reduction furnace which is coupled to a melter-gasifier for producing molten iron. At the reduction temperature of around 850° C., the volatile non-ferrous metals are vaporized and carried as top reduction gas to the off-gas scrubber 45 from the reduction furnace and captured in the sludge 47.

Through the process of this invention, the quantity of arc furnace waste may be reduced to about 5% of the total dust volume now being disposed of in hazardous waste landfills. Moreover, due to a concentration of metals, recovery of metal value is possible from the gas scrubber sludge. The sludge will consist of approximately one-half non-ferrous metals and the other half of about equal parts of metallic iron and carbon dust.

Electric arc furnace dust can be accumulated and agglomerated near an iron making site to be charged to the reduction furnace in "campaign" fashion during a pre-selected period of the iron making program with segregation of the non-ferrous metal sludge. Since the metals are vaporized and the gases present are reducing, the volatilized metal vapors will be transported through the pellet bed in the reduction furnace 44 as fume to the reduction furnace top gas duct which is heated to prevent metal condensation, and thereafter to the water based gas scrubber 45 for elimination as "campaign" scrubber sludge 47.

The quantity of scrubber sludge may be segregated from "non-campaign" non-ferrous metal free scrubber sludge which is dried and directly recycled to the melter gasifier. The quantity of the non-ferrous metal "campaign" scrubber sludge is about one twentieth of the initial quantity of electric arc furnace waste charged to the COREX® process. Because non-ferrous metals may be present in the top gas duct work and condense on the metal lining, the metal duct work connecting the reduction furnace 44 with scrubber 46 is preferably heated to at least or about 400° C. during campaign operation. Due to the concentrated metals content of the scrubber sludge, it may be viable to further process the sludge to recover the metals content.

In one form, the invention provides for "campaigning" the process of using electric arc furnace dust as the ferrous material feed for the COREX® process with the more conventional use of iron ore as the feed for the process. Thus, molten iron might be produced using petroleum coke and iron ore in a COREX® process for a given time period, for example three weeks to a month, then electric arc furnace dust, suitably agglomerated, is used to replace the iron ore as the feed to the reduction furnace in the COREX® process for a time period, for example a week, to process the electric arc furnace dust on hand. A scheduled of 11 consecutive months of using iron ore as the feed and 1 month of electric arc furnace dust is preferred. After this is accomplished, iron ore replaces the dust as the ferrous material in the process. The electric arc furnace dust is agglomerated into discrete particles about ½ inch in size, similar to iron ore pellets, using a bonding agent such as lime on Portland cement mixed with the dust for feed to a pelletizing apparatus.

Figure 2:
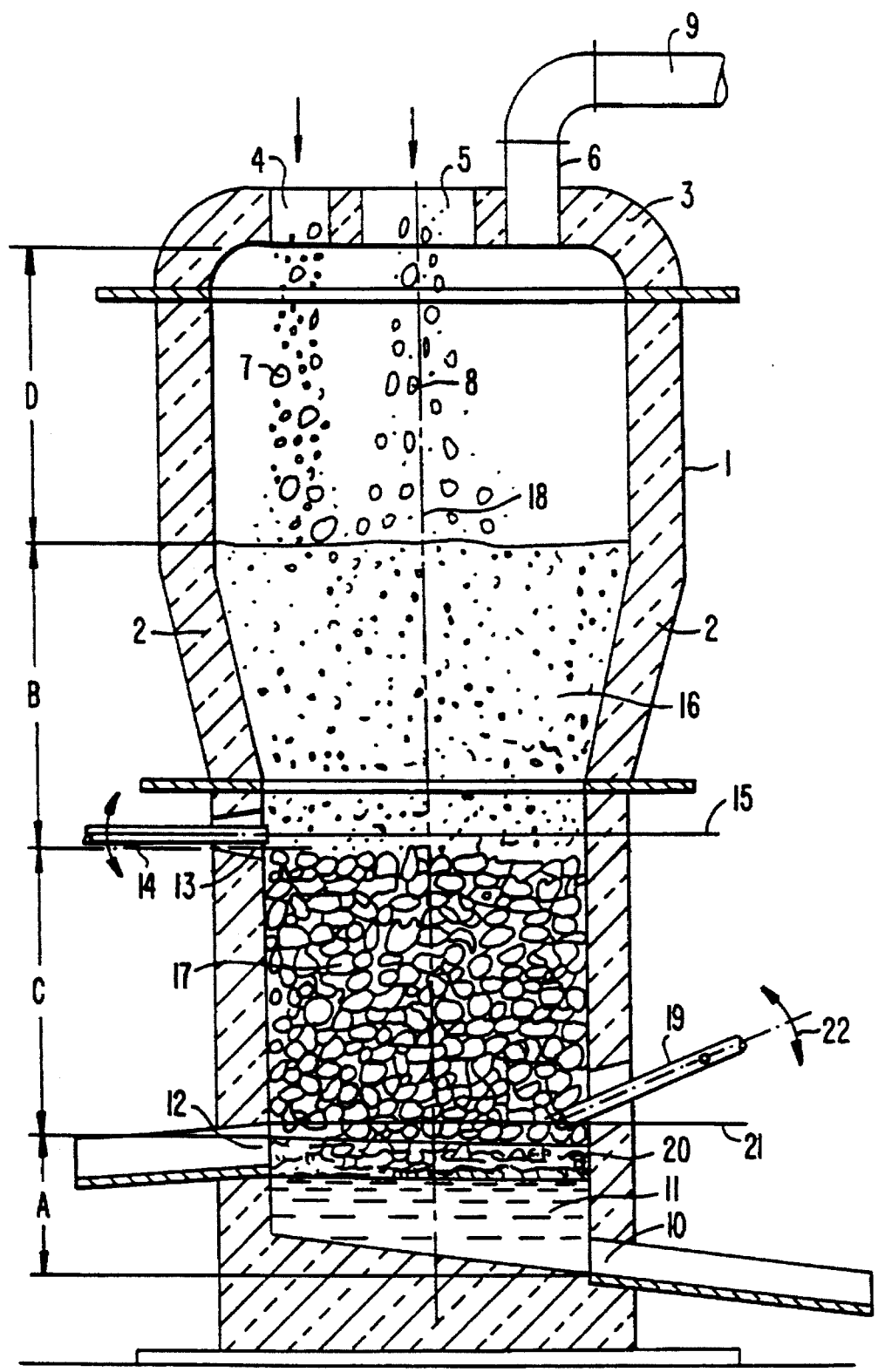
FIG. 2 is a schematic vertical section of a melter gasifier useful in accordance with the present invention.

FIG. 2 schematically illustrates a melter gasifier useful with the present invention. The melter gasifier, generally indicated by the numeral 1 has side walls 2 which are refractory lined on their inner sides. The hood 3 of the melter gasifier 1 has three openings 4, 5 and 6. In accordance with the opening 4 is adopted for charging petroleum coke 7 of various grain or piece sizes into the interior of the melter gasifier. Particulate ferrous material 8 preferably iron sponge from the reduction furnace, is charged into the melter gasifier through the opening 5. It is suitable to supply the iron sponge at an elevated temperature. In accordance with the present invention, the supply of sponge iron may be interrupted and electric arc furnace dust which has been reduced in the reduction furnace may be charged into the molter gasifier. To carry away the reduction gas which is formed during the reaction in the melter gasifier, a conduit 9 is provided extending out of opening 6. The reduction gas carried away may be is used in many processes to pre-reduce or reduce oxidic iron ore or electric arc furnace dust. It is advantageously used in the reduction furnace coupled to the melter gasifier.

In general the melter gasifier comprises a lower section A, a central section B, an intermediate section C between sections A and B and an upper section D above the central section B, whose cross section is widened and which serves as an expansion zone. In the bottom region of the lower section A of the melter gasifier 1, which serves to collect molten metal and liquid slag including any sulfur residue from the combustion of petroleum coke, a tapping opening 10 for the melt 11 is provided in the wall 2. Further up the wall, there is an opening 12 for the slag tap in the lower section A. Alternatively, the slag may be tapped with the metal and separated outside the melter gasifier. In the lower region of the central section B of the melter gasifier 1, a nozzle pipe 14 is inserted through an opening 13 in the wall 2. Oxygen-containing carrier gas is injected into the melter gasifier through nozzle pipe 14. If desired, carbon carriers can be introduced into the melter gasifier 1 in a first horizontal blow-in plain 15.

Preferably, a plurality of openings 13 with nozzle pipes 14 are present at this location spaced around the melter gasifier. In the central section B, a first fluidized bed zone 16 may be formed by coke particles from combusted petroleum coke. The intermediate section C, which, in the embodiment illustrated, is cylindrically designed, is provided to accommodate a second zone 17 of a fluidized bed formed by coke particles from combustion the petroleum coke. Generally, the coke particles in the fluidized bed in this section of the melter gasifier will have less motion than those in section B. Through the wall of the intermediate section C, gas supply means, in the present case nozzle pipes or tuyeres 19, are inserted The tuyeres are positioned to direct the gases toward the central axis 18 of the melter gasifier. The tuyeres are adapted for injecting oxygen-containing gas and carbon carriers into the melter gasifier. They project into the second zone 17 of coke particles, ending closely above the slag layer 20. Just one nozzle pipe 19 has been illustrated in FIG. 2 depending on the size of the melter gasifier, 10 to 40 preferably 20 to 30, nozzle pipes 19 may be provided, and located substantially in a second horizontal blow-in plane 21. The nozzle pipes 19 are arranged so as to be vertically pivotable in the direction of the double arrow 22. Also the nozzle pipes 14, through which the carrier gas and additional fuel flow into the first fluidized-bed zone 16 are designed to be vertically pivotable with the embodiment of the invention illustrated.

The ferrous material 8 which as noted may be sponge iron or reduced electric arc furnace dust from the reduction furnace introduced through the opening 5 at first reaches the first fluidized-bed zone 16 after having fallen through the upper section D of the melter gasifier which serve as an expansion zone, in which the ferrous material is slowed and heated. The ferrous material may comprise iron ore or alternatively electric arc furnace dust in a batch type process. Smaller particles melt, drop through the second zone 17 of coke particles and descend into the lower section A. Larger particles at first remain lying on the second zone 17 or are held fast in the uppermost layer of this zone, until they are also melted upon the action of the high temperature prevailing in the region of the first blow-in plane 15. In the second zone, the downwardly dropping metal melt is super-heated and, if desired, may be treated by the reaction of fine particle fluxes, which are introduced through the nozzle pipes 19. The metal melt 11 tapped through the opening in 10 is sufficiently hot in order to be subjected to further metallurgical aftertreatments. Above the melt 11, a layer of liquid slag 20 collects. The liquid slag may be stripped off via the tap opening 12. The petroleum coke particles, during operation of the melter gasifier, must be continuously supplemented through the opening 4 with larger pieces, which are preferably used to build up the second zone 17, after falling through the first zone 16. The melter gasifier shown in FIG. 2 and the prior art operation using coal or coke produced from coal are described in U.S. Pat. No. 4,588,437.

Figure 3:
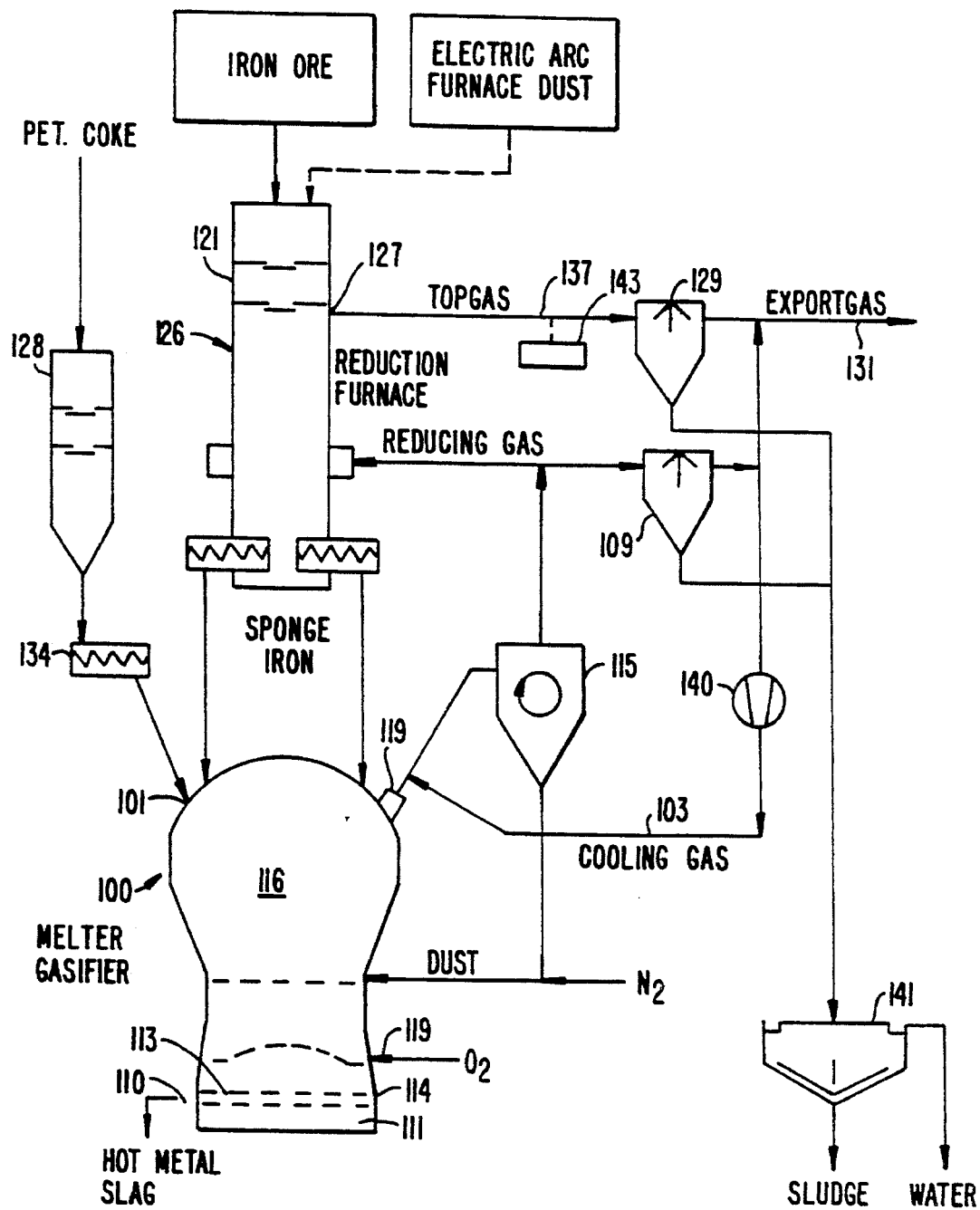
FIG. 3 is a schematic flow sheet illustrating the COREX® process in which the method of the present invention is particularly useful.

Refer now to FIG. 3 which is a schematic flow sheet of the COREX® process in which the method of the invention is particularly useful. The COREX® process utilizes a melter gasifier substantially similar to the melter gasifier of FIG. 2 and is generally indicated in FIG. 3 by the numeral 100. The COREX® process is designed to operate under elevated gas pressures up to five bar. The process pressure is supplied from the integral oxygen production facility which supplies oxygen through the tuyeres 119 on the COREX® melter gasifier 100. Gasifier gas pressure from the melter gasifier 100 operates the primary direct reduction furnace 126 for iron ore reduction to sponge iron when the process is being run with iron ore. Alternatively, electric arc dust may be reduced in the direct reduction furnace.

Charging of petroleum coke to the melter gasifier 100 is accomplished through a pressurized lock hopper 128. The iron ore or electric arc furnace dust is supplied to the reduction furnace 126 through a similar lock hopper 121 in a manner well known to those skilled in the art. The petroleum coke is stored in a pressurized bin and charged into the melter gasifier by suitable means such as speed controlled feed screw 134.

Upon entering the dome of the melter gasifier 100, at entry port 101, the 10% of residual hydrocarbons contained in the petroleum coke are flashed off at 1100° C. and cracked in the reducing atmosphere to CO and $H_2$. The calcined petroleum coke particles are rapidly heated to 1100° C. and descend with the hot reduced iron particles and hot calcined lime particles from the reduction furnace 126 to the dynamic fluidized bed. The calcined petroleum coke (essentially all carbon) is gasified into CO which rises to the gasifier gas outlet 119.

When electric arc furnace dust is utilized, with the high temperature reduction gas (850° C.) and rich reducing conditions in the reduction furnace 126, the zinc, cadmium and lead from the electric arc furniture dust will be vaporized and be transported in the reduction furnace top off gases out exit 127. Since the non-ferrous metals are vaporized and the off gas stream is reducing, the metal vapors will be transported into the heated reduction furnace top gas duct work 137 to the top gas scrubber 129. The duct work 137 between the reduction furnace 126 and the top gas scrubber 129 should be heated to at least 400° C. to prevent condensation on the duct. With heated duct work, the non-ferrous metals will be transferred to the wet scrubber 129 and eliminated as sludge in vessel 141. Alternatively, with heated duct work and a liquid metal reservoir 143 ahead of the scrubber, the metal vapors can be condensed separately from the sludge and collected as a marketable metal product.

The iron particles are melted in the dynamic particle bed 116 and drop to a molten liquid iron pool 111 accumulated below the oxygen tuyeres 119 on the melter gasifier hearth 114. The silica and alumina oxide content of the sponge iron is fluxed and melted with the calcined lime in the bed to form liquid slag droplets which descend and form a liquid slag layer 113 covering the liquid iron pool 111. The liquid iron and slag are periodically tapped and removed through a taphole 110 from the melter gasifier hearth.

As the calcined coke burns at a high temperature with oxygen above the tuyeres 119, an oxidizing coolant, such as steam or $CO_2$, or both are injected at the tuyere level to maintain the melter gasifier dome temperature of 1100° C. The injected coolants create additional reducing gas with hydrogen forming from reduction of the steam and CO forming from the reduction of the $CO_2$. The combined reducing gases rise to the gasifier gas outlet main 119 at 1100° C. where they are tempered with a side stream from the cooling gas scrubber 109 and cooling gas blower 140 via line 103 to 850° C. before passing to the hot cyclone 115 and the reduction furnace 126. The gasifier gas cooling is useful to avoid fusion and maintain discrete free flowing particles in the column of the reduction shaft furnace 126. Overheating will cause clusters or clinkers to form inside the shaft furnace with disruption of the furnace solids and gas flow.

After being cooled in the cooling gas scrubber 109 and cleaned of dust in the hot cyclone 115, the gasifier gas is passed upward in the reduction furnace 126 through the descending bed of ferrous material, either iron ore or agglomerated electric arc furnace dust, converting it to metallic sponge iron and carburizing the reduced iron to a level of three to five percent prior to hot discharge to the melter gasifier 100. The gasifier gases are partially consumed by the reaction in the reduction furnace and discharged at 127 as furnace top gas at 400° C. The top gases are cleaned in the top gas wet scrubber 129, removing water vapor formed during iron ore reduction and discharged as export gas 131 at 40° C. The export gas is low in particulates and sulfur and has a heating value of 220 Btu/scf while containing 25% of $CO_2$.

The highly preferred mode of the present invention utilizes petroleum coke in combination with a melter gasifier. The reduction gas from the melter gasifier is used in the reduction furnace to reduce the electric arc furnace dust to vaporize the non-ferrous metals, i.e., zinc, cadmium and lead, contained in the dust and to reduce the iron oxide contained in the dust. It is noted that coal or metalurgical coke could be used in place of petroleum coke as the fuel in the melter gasifier. Further the process of removing the non-ferrous metals could be carried out in a reduction furnace without need for a melter gasifier using a different source of hot reduction gas to vaporize the zinc, cadmium and lead. For example a suitable source of hot reduction gas would be the hot gas resulting from natural gas reforming.

The present invention provides a method for processing environmentally undesirable materials including petroleum coke and the sulfur and heavy metals contained therein and waste dust from an electric arc furnace and the cadmium, lead, zinc and iron oxide contained therein and of providing fuel and a charging material for a process of making molten iron or steel preproducts and reduction gas in a melter gasifier. A melter gasifier is provided and has an upper fuel charging end, a reduction gas discharging end, a lower molten metal and slag collection end. A reduction furnace is operably connected to the melter gasifiers. An entry is formed for charging metallized ferrous material into said melter gasifier from a reduction furnace. Petroleum coke is introduced into the melter gasifier at the upper fuel charging end and oxygen-containing gas is blown into the petroleum coke to form at least a first fluidized bed of coke particles from the petroleum coke. Vaporized zinc, cadmium and lead from the electric arc furnace waste dust material which has been processed in the reduction furnace is removed with the top off gas. Metallized iron oxides are introduced into the melter gasifier through the material changing entry means. The petroleum coke, oxygen and metallized iron oxides from waste dust material are reacted to combust the major portion of the petroleum coke to produce reduction gas and molten iron. The molten iron contains the heavy metals freed from combustion of the petroleum coke. A slag is formed containing sulfur freed from combustion of the petroleum coke. The reduction gas is removed from the melter gasifier and use in the reduction furnace.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention as defined in the following claims are expressly intended to be embraced thereby.

What is claimed is:

1. A method of treating electric arc furnace dust comprising the steps of charging a reduction furnace with agglomerates of electric arc furnace dust including the non-ferrous metals contained therein, passing a hot reduction gas through said agglomerates in said reduction furnace under reducing conditions and at a temperature sufficient to reduce said agglomerates to produce metallized iron and a top off gas containing vapors of said non-ferrous metals, removing said metallized iron and said top off gas from said reduction furnace while maintaining said top off gas under reducing conditions and condensing said vapors of said non-ferrous metals contained in said top off gas to produce concentrated non-ferrous metals.

2. The method of claim 1 further characterized by said temperature being at least 800° C.

3. A method of treating electric arc furnace dust comprising the steps of charging a reduction furnace with electric arc furnace dust including the non-ferrous metals contained therein, passing a hot reduction gas through said electric arc furnace dust in said reduction furnace under reducing conditions and at a temperature sufficient to reduce said electric arc furnace dust to produce metallized iron and a top off gas containing vapors of said non-ferrous metals, removing said metallized iron and said top off gas from said reduction furnace while maintaining said top off gas and the vapors of said non-ferrous metals contained therein under reducing conditions and condensing said vapors to produce non-ferrous metal.

4. A method of treating waste material containing non-ferrous metals comprising the steps of charging a reduction furnace with waste material containing non-ferrous metals, passing a hot reduction gas through said material in said reduction furnace under reducing conditions and at a temperature sufficient to produce a top off gas containing vapors of said non-ferrous metals, removing said top off gas from said reduction furnace while maintaining said top off gas and the vapors of said non-ferrous metals contained therein under reducing conditions and condensing said vapors to produce non-ferrous metal.

* * * * *